United States Patent [19]

Beshty

[11] Patent Number: 4,946,667

[45] Date of Patent: Aug. 7, 1990

[54] METHOD OF STEAM REFORMING METHANOL TO HYDROGEN

[75] Inventor: Bahjat S. Beshty, Lower Makefield, Pa.

[73] Assignee: Engelhard Corporation, Edison, N.J.

[21] Appl. No.: 191,725

[22] Filed: May 6, 1988

Related U.S. Application Data

[63] Continuation of Ser. No. 743,204, Jun. 10, 1985, abandoned.

[51] Int. Cl.$^5$ ............................ C01B 3/02; C01B 3/32
[52] U.S. Cl. ................................. 423/648.1; 252/373; 502/320; 502/342; 502/346
[58] Field of Search .................... 423/650, 648 R, 651, 423/644; 252/373

[56] References Cited

U.S. PATENT DOCUMENTS

| | | |
|---|---|---|
| 3,179,500 | 4/1965 | Bowen et al. ........................ 422/189 |
| 3,469,944 | 9/1969 | Bocard et al. ....................... 423/650 |
| 3,635,682 | 1/1972 | Vine et al. ........................... 423/651 |
| 3,962,411 | 6/1976 | Setzer et al. ......................... 423/651 |
| 3,965,253 | 6/1976 | Miller et al. ......................... 423/651 |
| 4,088,450 | 5/1978 | Kosaka et al. ................... 423/648 R |
| 4,091,086 | 5/1978 | Hindin et al. ....................... 502/342 |
| 4,175,115 | 11/1979 | Ball et al. .......................... 423/648.1 |
| 4,224,298 | 9/1980 | Robinson ............................. 423/650 |
| 4,316,880 | 2/1982 | Jockel et al. .................... 423/648 R |
| 4,331,449 | 5/1982 | Jockel et al. ........................ 252/373 |
| 4,545,976 | 10/1985 | Osman ................................. 423/650 |
| 4,567,857 | 2/1986 | Houseman et al. .......... 123/DIG. 12 |
| 4,588,659 | 5/1986 | Abens et al. ........................ 48/102 R |
| 4,670,187 | 6/1987 | Schurmans et al. ................ 422/189 |
| 4,670,359 | 6/1987 | Beshty ................................... 429/20 |
| 4,676,972 | 6/1987 | Velenyi et al. .................... 423/648.1 |
| 4,692,322 | 9/1987 | Möller et al. ........................ 252/373 |
| 4,780,300 | 10/1988 | Yokoyama et al. ................. 502/315 |
| 4,789,540 | 12/1988 | Jenkins ................................ 252/373 |
| 4,840,783 | 6/1989 | Quang et al. ..................... 423/648.1 |
| 4,855,267 | 8/1989 | Cheng ................................... 502/50 |

FOREIGN PATENT DOCUMENTS

| | | | |
|---|---|---|---|
| 1098315 | 3/1981 | Canada ................................ 252/373 |
| 2135295 | 8/1984 | United Kingdom . | |

OTHER PUBLICATIONS

49-Industrial Inorganic Chemicals, Louis Koenig, pp. 166, 1969.

Primary Examiner—Anthony McFarlane

[57] ABSTRACT

The production of hydrogen by the catalyzed steam reforming of methanol is accomplished using a reformer of greatly reduced size and cost wherein a mixture of water and methanol is superheated to the gaseous state at temperatures of about 800° to about 1,100° F. and then fed to a reformer in direct contact with the catalyst bed contained therein, whereby the heat for the endothermic steam reforming reaction is derived directly from the superheated steam/methanol mixture.

6 Claims, 4 Drawing Sheets

METHOD OF STEAM REFORMING METHANOL TO HYDROGEN

This application is a continuation of application No. 06/743204 filed 06/10/85, now abandoned.

BACKGROUND OF THE INVENTION

1. Field of the Invention

This invention relates to a method and apparatus for producing a hydrogen containing gas by steam reforming of methanol. This reformer is particularly suitable for use in an integrated fuel cell system for producing electric power from methanol.

2. The Prior Art

During recent years, industrial requirements for hydrogen have increased rapidly, and a variety of processes for the manufacture of hydrogen have been developed to fill this need. Large quantities of hydrogen are used, for example, in synthesis of ammonia; for catalytic hydrogenation, for example, of oils to solid fats; in petroleum processes such as hydrofining; and as a fuel, e.g. in missiles and in fuel cells for the generation of electricity.

Direct oxidation of fuels such as methanol in fuel cells at practical current densities with acceptable catalyst loadings is not as economically attractive as conversion of methanol fuel to a hydrogen-rich mixture of gases via steam reforming and subsequent electrochemical conversion of the hydrogen-rich fuel stream to direct current in the fuel cell.

A very attractive fuel cell system currently undergoing commercial consideration is the reformed methanol fuel-phosphoric acid electrolyte-air system. Primary advantages of phosphoric acid electrolyte (85 wt. %) include ability to operate with ambient air containing $CO_2$, ability to operate with a thin matrix electrolyte (no liquid circulation) and chemical stability of the electrolyte over the operating temperature of the cell, e.g. 300°–400° F.

The fuel cell itself is only part of the overall system and other components of the system, e.g. generation of hydrogen is equally important in terms of overall system size and cost effectiveness.

In one method used by the prior art, hydrogen is produced by steam reforming methanol in a reactor which is shaped much like a conventional shell and tube heat exchanger except that the tubes contain catalysts. In these reactors, hot gases (typically combustion products) are passed through the shell of the heat exchanger while the methanol and water vapor is passed through the tubes. Thus, the heat required for the endothermic catalytic reforming reaction must pass through the wall of the tube. In these prior art processes, the mixture of methanol and steam is converted to a gaseous stream consisting primarily of hydrogen (about 68%) and $CO_2$ (about 21.7%), CO (about 1.5%) and $H_2O$ (about 8.8%). In order to improve the thermal and chemical efficiency of such reactors, efforts have been directed to improve the uniformity of heat distribution in the tubes within the reactor to secure high chemical conversion of fuel into hydrogen and maintain catalyst bed temperature within certain limits (>700° F.) in order to avoid premature catalyst aging while minimizing the amount of energy used to produce each unit of hydrogen containing gas.

For efficient operation of the steam reforming reaction, large surface areas are required to transfer the heat from the combusted gases to the tubes. In reformers presently used for steam reforming small diameter reaction tubes are clustered closely together in the furnace so that heat transfer from the combusting gases in the reactor into the catalyst packed tubes is optimized.

The use of a plurality of tubes to accomplish heat transfer contributes to the large size and high cost of the reformer. In fuel cell systems in which the reformer and the fuel cell are fully integrated, i.e. the combustion gases for the reforming reaction are derived from the fuel cell exhaust, the shell side heat transfer coefficient between the hot gas and the tube is characteristically low and hence, the rate of reaction is limited primarily by the rate of heat transfer. This problem is particularly severe at the reactor entrance as the rate of the endothermic reaction is very high, and thus, the amount of heat required is very high while the shell side heat transfer coefficient is often low as the mechanical design of typical reactors often allows the gases in the shell to be relatively stagnant near the tube entrances. This leads to a drop in the overall efficiency as a large portion of each reactor tube operates at an undesirably low temperature. Thus, in order to effect complete conversion, the reformer must be relatively large and expensive.

SUMMARY OF THE INVENTION

It is the primary object of the present invention to provide a novel process and apparatus for the production of hydrogen by steam reforming of methanol that can be accomplished with a thermally efficient reformer of reduced size and cost which can be integrated with a fuel cell power system or used as a stand alone hydrogen generator.

According to the present invention, production of hydrogen by steam reforming of methanol or other hydrocarbon fuels is accomplished in a reformer of substantially reduced size by superheating a gaseous mixture of water and methanol to a temperature of about 700° to about 1100° F. and then passing the superheated gaseous mixture over a catalyst bed contained in a reformer. At least a substantial portion of the heat for the endothermic steam reforming reaction is provided by the sensible heat in the superheated steam/methanol stream augmented by heat transferred through the tube wall depending on the overall system considerations. The concept of providing a substantial portion of the heat for the endothermic reforming reaction by sensible heat in the superheated steam/methanol stream is referred to hence forth as "direct heating."

Direct heating is of considerable advantage as it largely overcomes the problems encountered with reaction rates being limited by the rate of heat transfer through the tube wall especially near the reformer entrance and thus, for a given conversion, the reactor may be smaller, more efficient and less expensive. As compared to the prior art, high steam to methanol ratios are required for direct heated reformers, typically in the range of from 1 to as high as 10. The relatively large amounts of steam passed through the bed continuously clean the catalyst by removing ethanol and suppressing production of carbon monoxide and retard catalyst poisoning thereby enhancing catalyst stability.

Direct heated reformers are particularly suitable for integration with fuel cells as the heat and fuel values contained in exhaust stream from each component can be utilized in the other. Hydrogen contained in the exhaust gas from the fuel cell anode may be burned to superheat the methanol/water mixture being fed to the reformer. In some embodiments, once the reactor is warmed up, the entire fuel requirements for the system are provided by the methanol being fed to the reformer.

BRIEF DESCRIPTION OF THE INVENTION

DETAILED DESCRIPTION OF THE INVENTION

Figure 1:
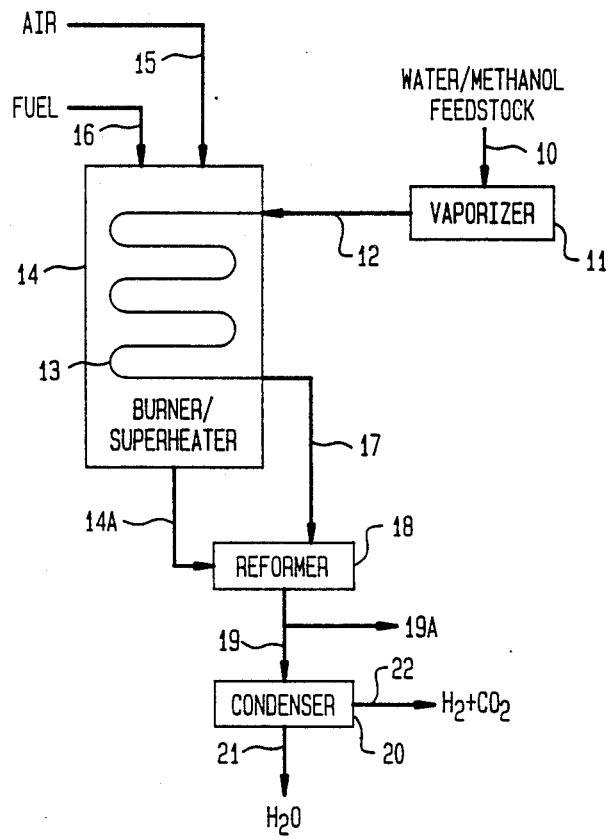
FIG. 1 is a schematic of the reforming process.

FIG. I schematically illustrates a flow scheme in accordance with this invention of the steam reforming of methanol for the production of hydrogen therefrom. As illustrated in the Figure, a water and methanol feedstock preferably having a water/methanol mole ratio ranging from about 2.0 to about 9.0, and preferably about 2.5 to about 4.0, is supplied via conduit 10 to vaporizer 11 wherein the water/methanol feed supplied thereto is heated to a temperature of about 200° to about 300° F. to convert the feedstock into a gaseous mixture. The hot gaseous steam/methanol stream then exits the vaporizer via line 12 and is supplied to a superheater coil 13 contained in burner 14. The gaseous mixture contained in the coil 13 is superheated to a temperature of about 700° to about 1,100° F., and preferably about 850° F. to about 1,000° F., the fuel for the heating being supplied to the burner via conduit 16 together with an oxidizing gas such as air or oxygen via conduit 15. In reforming systems integrated with fuel cells, the fuel burned in the burner 14 may be unreacted hydrogen gas exhausted from the anode side of the fuel cell which undergoes combustion with an oxidizing gas such as air or oxygen.

Gases resulting from the combustion reaction may exit the burner 14 via line 14A to the reformer 18 in contact with the outside of the catalyst bed providing some additional heat to the reforming reaction and reducing heat loss from the reactor 18, thereby reducing the size of reactor 18. The superheated steam/methanol gaseous mixture exits the superheater coil 13 preferably at a temperature of 850° to 1,000° F. and a pressure of 14.7 to 150 psia via line 17 and is supplied to the reformer 18 at the desired superheated temperature and pressure.

The superheated steam/methanol gaseous mixture is reformed as it passes through a tube packed with a suitable catalyst (not shown) contained in the reformer 18. The steam reforming catalyst is typically a metal or metal oxide supported on an inert ceramic material. For example, a common steam reforming catalyst is zinc oxide (e.g. about 40% to 65% by weight zinc)/chromium oxide (about 10% to 30% by weight chromium) or a zinc oxide (about 5% to 15% by weight zinc)/copper oxide (about 20% to 35% by weight copper) combination supported on alumina (about 20% to 40% by weight).

Steam reforming in accordance with the practice of the present invention is optimized and heating is often accomplished more readily when the reformer tube is divided into two catalyst sections, i.e. a first section from the inlet to the reactor tube to about ⅓ the length of the reactor tube containing a catalyst which has relatively low activity but good resistance to high temperatures such as zinc/chromium oxides and a second section extending from the end of the first section to the outlet area of the reactor tube containing a high activity catalyst such as copper/zinc oxides. Alternatively, the low activity, high temperature resistant catalyst may be used by itself.

In order to accommodate the endothermicity of the reforming reaction, at least a major portion of the heat required for reforming is provided to the reformer 18 as sensible heat contained in the superheated gases. Thus, when methanol and steam vapors contact a catalyst such as a combination of zinc oxide and copper oxide at 500° to 900° F. at atmospheric or higher pressure, methanol decomposes to carbon monoxide and hydrogen and the carbon monoxide and steam react according to the well known water gas shift reaction to form carbon dioxide and hydrogen as set forth below:

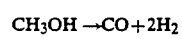
$$CH_3OH \rightarrow CO + 2H_2$$

$$CO + H_2O \rightarrow CO_2 + H_2$$

so that the overall reaction taking place in the reformer 18 is:

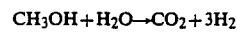
$$CH_3OH + H_2O \rightarrow CO_2 + 3H_2$$

Thus, within the reformer 18, the methanol and steam react endothermically at high temperature to produce a gaseous product consisting primarily of steam, hydrogen and carbon dioxide which is recovered from reactor 18 and supplied via conduit 19 either to condenser means 20, wherein most of the water is removed from the gaseous hydrogen/carbon dioxide mixture by cooling the gaseous mixture to condense the water or directly via line 19a to the fuel cell or other unit in which hydrogen is used. Where condensing means are used, water exits condenser 20 via line 21 and a gaseous mixture of hydrogen and carbon dioxide exit condenser 20 via line 22 and in this state may be supplied for direct utilization at the fuel side or anode of a fuel cell. If desired, the hydrogen/carbon dioxide mixture may be further fractionated, by means not shown, to recover separated quantities of hydrogen and carbon dioxide.

In a typical hydrogen production process using the reforming system illustrated in FIG. I, methanol is passed with steam over a catalyst at pressure typically ranging from 14.7 to 150 psia and temperatures in the range of about 850° to about 1,000° F. Typical steam to methanol mole ratio ($H_2O$/Carbon) are in the range of about 2.5:1 to about 4:1. The conversion of methanol may be effected in one pass over the catalyst bed contained in the reformer.

Figure 2:
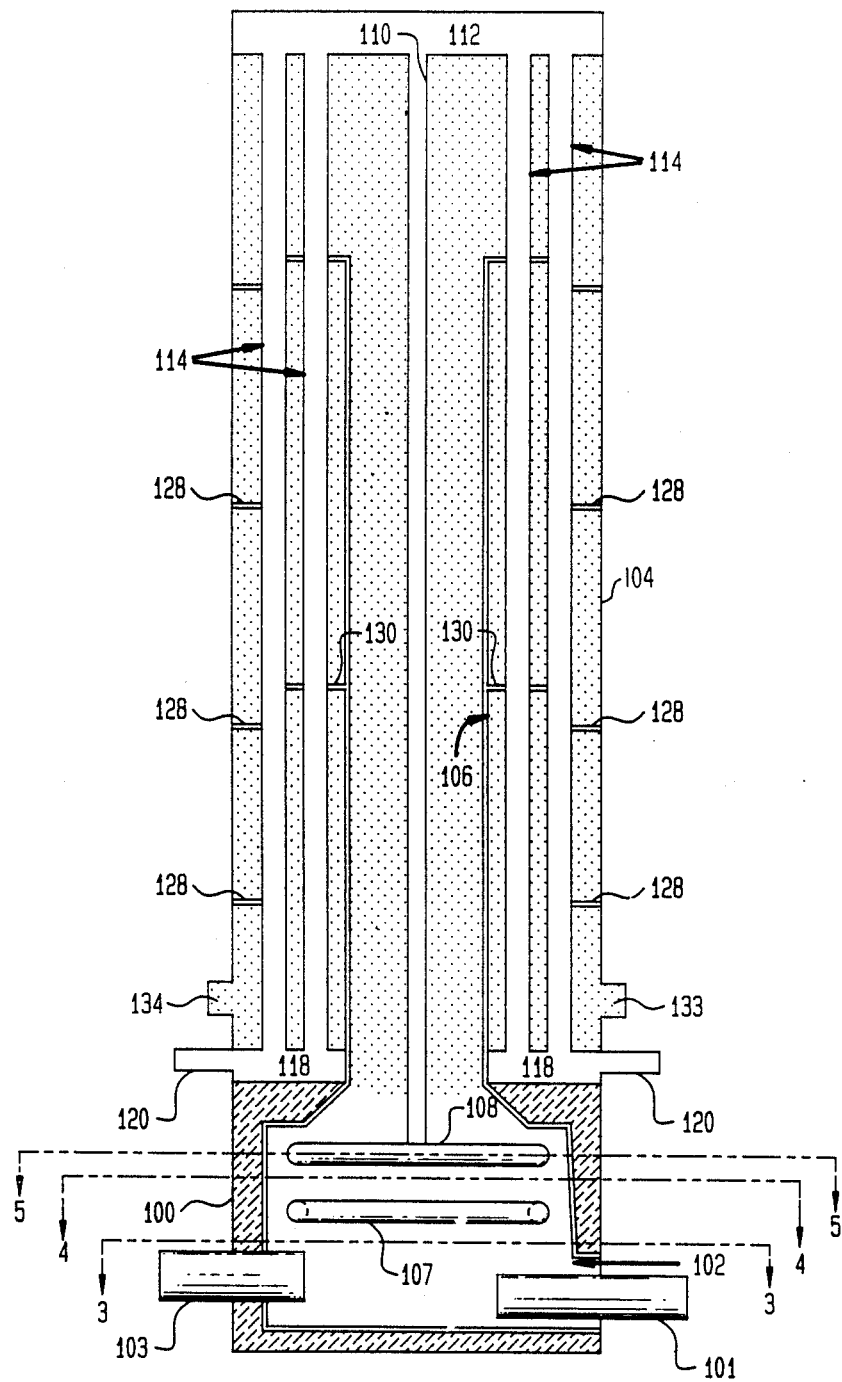
FIGS. 2–5 are illustrations of an assembly integrating a steam reformer, combustor, superheater and a fuel cell air preheater in one compact unit.
Figure 3:
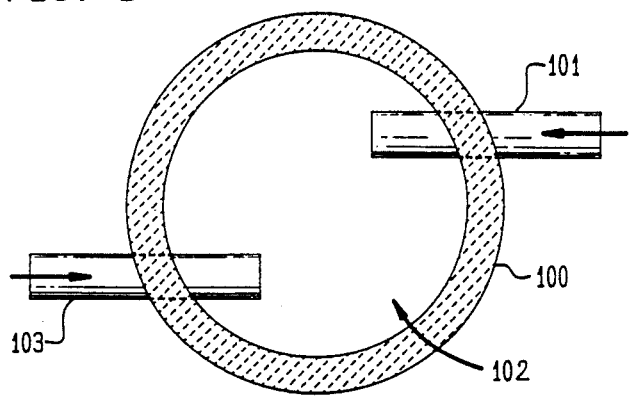
Figure 4:
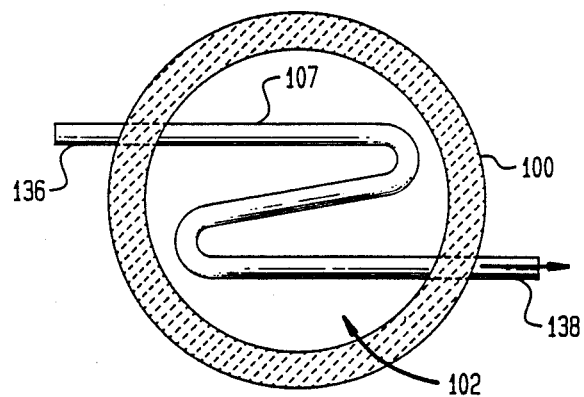
Figure 5:
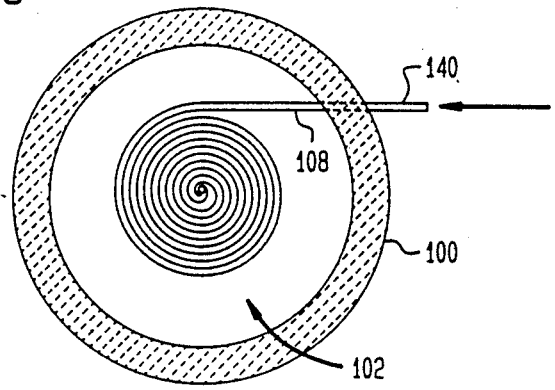

FIGS. 2, 3 and 4 illustrate an assembly integrating a steam reformer, combustor, superheater and fuel cell air preheater in one compact unit. As illustrated in FIG. 2, cylindrical housing 100 defines combustion chamber 102 mounted adjacent to shell 104 having central duct 106 passing therethrough. Hydrogen supply duct 101 and methanol supply duct 103 lead into combustion chamber 102 to provide fuel for vaporizing and superheating the methanol water mixture. Air preheater tube 107 passes through combustion chamber 102 below superheater coils 108 disposed within combustion chamber 102 and operably connected to methanol supply/heater tube 110 passing through central duct 106 in shell 104. Methanol supply/heater tube 110 exits into methanol inlet plenum 112 opening into reformer tubes 114 leading to hydrogen exhaust plenum 118 having hydrogen exhaust ports 120 operably connected thereto. As illustrated in FIGS. 3 and 4, air preheater 107 is disposed below methanol steamfeed superheater coils 108 in combustion chamber 102 and is operably connected to the cathode of the fuel cell (not shown). In operation, a fuel-air mixture (such as hydrogen from the anode of a fuel cell) is introduced into combustion chamber 102 through combustor inlet duct 101, the exhaust from combustion chamber 102 flows cocurrently along methanol supply/heater tube 110 over reformer tubes 114, past baffles 128 and 130, then exits through combustor exhaust ports 133 and 134. Air for the cathode of the fuel cell enters air inlet port 136, passes through air preheater 107 situated in combustion chamber 102 and exits through air exhaust port 138. The methanol water mixture to be reformed enters through methanol inlet port 140, is superheated in superheater coils 108 located in combustion chamber 102, then is directed cocurrently upward with the combustion exhaust through methanol supply/heater tube 110 into methanol inlet plenum 112, thence through reformer tubes 114 and exits through hydrogen exhaust plenum 118 and hydrogen exhaust ports 120.

Figure 6:
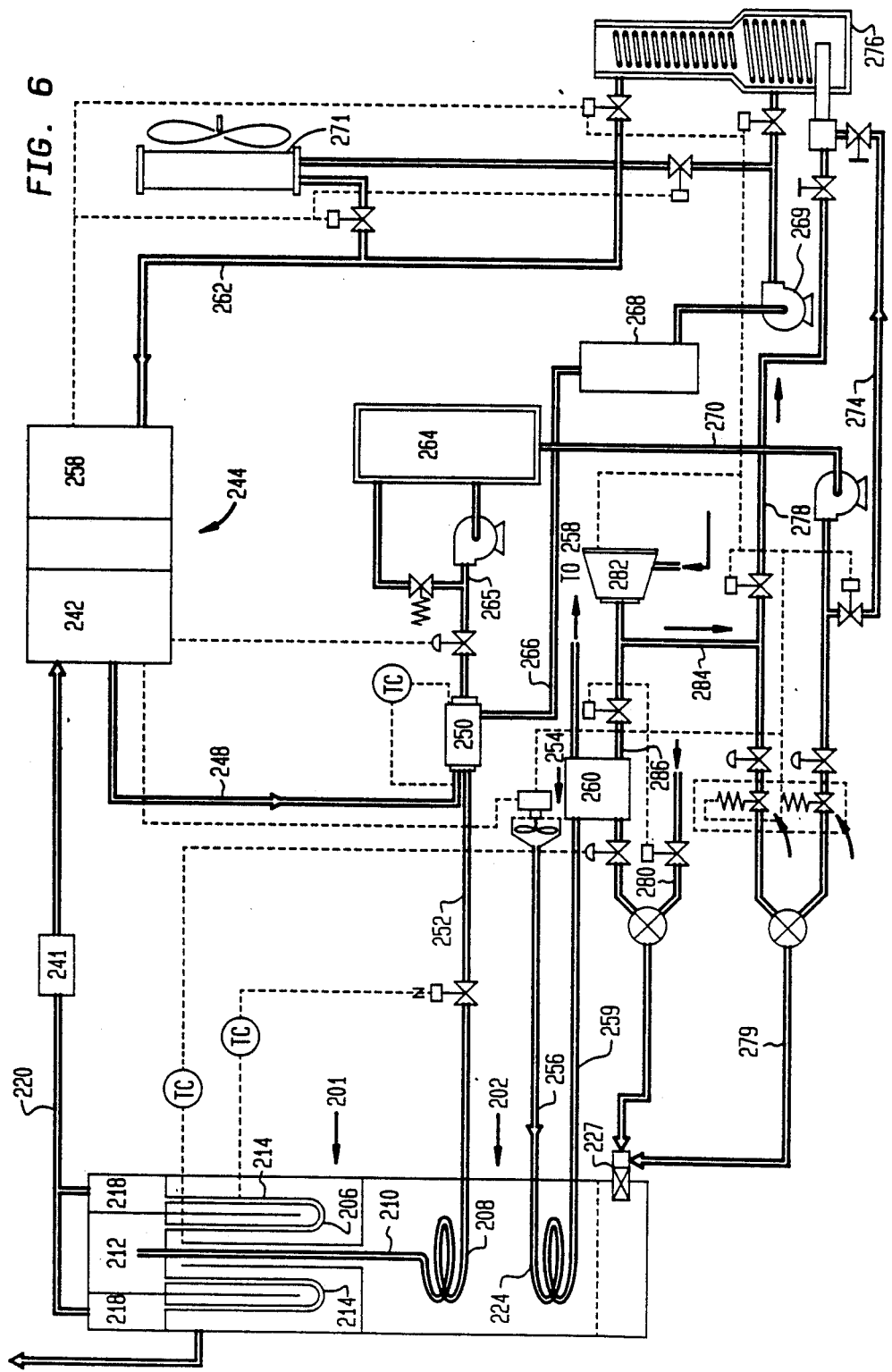
FIG. 6 is a detailed depiction of an apparatus suitable for practice of the present invention.

In FIG. 6, integrated heater reformer unit 201 is substantially the same as the integrated reformer unit illustrated in FIGS. 2 through 5 having combustion chamber 202 formed therein opening into central duct 206. Superheater coil 208 disposed within combustion chamber 202 is operably connected to methanol supply/heater tube 210 disposed within central duct 206 and opens into methanol intake plenum 212 joined by reformer tubes 214 to hydrogen exhaust plenum 218 having hydrogen exhaust line 220 connected thereto leading to condenser 241 and thence to anode 242 of fuel cell 244. Hydrogen contained in the exhaust from anode 242 of fuel cell 244 is removed by means not shown and is fed to combustion chamber 202 through line 280 and burner 227. Fuel cell coolant circulates through fuel cell 244 removing excess heat therefrom, line 248 conducts the fuel cell coolant to evaporator 250 which vaporizes the water methanol feed supplied to superheater 208 through line 252. Air preheater coil 224, disposed within combustion chamber 202, heats air entering through inlet 254 connected to line 256 then returns it to cathode chamber 258 of fuel cell 244 through heat exchanger 260 and means not shown. Heat exchanger 260 also serves to preheat combustion air passing through line 286 and burner 227. Methanol and water mix to be reformed into hydrogen and converted in fuel cell 244 is stored in tank 264 connected to evaporator 250 by line 265. Fuel cell coolant from evaporator 250 passes through line 266 to coolant tank 268 which stores coolant for use in the cooling system used to remove excess heat from fuel cell 244. During steady operation, excess heat is removed from the coolant in air cooler 271, bypassing start-up furnace 276. Fuel for combustion chamber 202 leaves tank 264 through line 270 leading to combustor 202 through line 279. For start-up, a portion of the fuel is passed through line 270 to line 274 leading to start-up heater 276 while another portion passes to reformer combustion chamber 202 through line 279. Excess hydrogen contained in the exhaust from anode 242 us fed to combustion chamber 202 through line 280. Air for combustion chamber 202 is compressed by compressor 282 and passes to combustion chamber 202 through line 286. Air for start-up heater 276 passes through line 286. While air for combustion of methanol passes through line 27, coolant circulating through start-up heater 276 and line 262 raises fuel cell 244 to proper operating temperature upon start-up. In steady operation, hydrogen produced in reformer tubes 214 is converted to electricity in fuel cell 244, exhaust hydrogen from anode 242 of fuel cell 244 is used to supply fuel value to combustion chamber 202. While heat rejected from fuel cell 244 is used to vaporize the methanol water feed.

EXAMPLE I

A mixture of methanol and water containing 1.3 moles of water per mole of methanol was preheated to 385° F., then superheated to 720° F. Five thousand five hundred (5500) ml/hr of the superheated mixture was passed through reformer tubes containing 6290 cc of a zinc oxide-copper oxide-alumina catalyst comprising 11.6 wt. % zinc, 27.5 wt. % copper and 29.2 wt. % alumina, having a specific gravity of 6050 g and a bulk density of 0.92 gm/cc. The space velocity within the reformer was therefore 0.469 $hr^{-1}$ on a mass basis (g/hr of methanol/g of catalyst) or 985 $hr^{-1}$ on the basis of volumes of $H_2$ in the feed per hour/catalyst volume. The reaction tubes were disposed within a shell heated by 14,000 g/hr of flue gases entering the shell at 890° F. and leaving at 547° F. yielding an average rate of heat input to the reformer of 5200 kcal/hr. The average catalyst bed temperature was 535° F., and the temperature of the reactants leaving the reformer was 565° F. The conversion of methanol was essentially completely converted yielding 8,185 l. of gas at STP per hour having a composition of 73.4 mole % $H_2$, 24.0 mole % $CO_2$ and 2.6 mole % CO.

EXAMPLE II

The procedure of Example I was repeated in a single tube laboratory scale reformer 1 in. in diameter by 12 in. long maintained at 525° F. using a volumetric space velocity of 836 $hr^{-1}$ (cc of $H_2$ at STP per hour/cc of catalyst). The methanol conversion obtained was 98.48%. Analysis of the product gases indicated a composition of 74.8 mole % $H_2$, 24.0 mole % $CO_2$ and 1.21 mole % CO.

I claim:

1. In a process for the production of hydrogen, said process comprising passing a gaseous feed mixture consisting essentially of methanol and water into a reactor over a catalyst bed, the improvement comprising superheating the gaseous mixture to a temperature between about 700° F. and 1100° F. while controlling both the ratio of water vapor to methanol in, and the degree of superheat, of the gaseous feed mixture at such values that upon feeding the superheated gaseous mixture to the reactor in contact with the catalyst bed contained therein to produce hydrogen, at least a major portion of the heat required for the endothermic catalytic reforming reaction is extracted directly from the superheated gaseous mixture.

2. The process of claim 1 wherein the catalyst bed is divided into a first section extending from the inlet of the reactor bed and a second section extending from the end of the first section to the outlet of the reactor bed, the first section containing a low activity, high temperature resistant steam forming catalyst and the second section containing a high activity steam reforming catalyst.

3. The process of claim 1 wherein the catalyst in the catalyst bed is a combination of zinc oxide and chromium oxide on alumina.

4. The process of claim 2 wherein the low activity catalyst is a combination of oxides of zinc and chromium comprised of about 40% to 60% by weight Zn and about 10% to 30% by weight Cr and the high activity catalyst is a combination of oxides of zinc and copper on alumina comprised of about 5% to 20% by weight Zn, about 20% to 35% by weight Cu and about 20% to 40% by weight alumina.

5. The process of claim 1 wherein the water/methanol molar ratio in the gaseous mixture is between about 1.0 to about 10.0.

6. The process of claim 1 wherein the gaseous mixture is superheated to a temperature of about 850° to about 1,000° F.

* * * * *